(12) United States Patent
O'Leary et al.

(10) Patent No.: US 8,033,850 B2
(45) Date of Patent: Oct. 11, 2011

(54) JOINT-PACK INTEGRATED SPACERS

(76) Inventors: Timothy P. O'Leary, Antioch, TN (US); Wesley Travis, Murfreesboro, TN (US); Thomas N. Lesieur, Murfreesboro, TN (US)

( * ) Notice: Subject to any disclaimer, the term of this patent is extended or adjusted under 35 U.S.C. 154(b) by 145 days.

(21) Appl. No.: 12/630,528

(22) Filed: Dec. 3, 2009

(65) Prior Publication Data
US 2011/0136362 A1 Jun. 9, 2011

(51) Int. Cl.
H01R 4/38 (2006.01)
(52) U.S. Cl. ............... 439/213; 174/88 B; 174/16.2
(58) Field of Classification Search ............ 439/213, 439/115, 210, 212, 114; 174/886, 16 B, 174/16.2
See application file for complete search history.

(56) References Cited

U.S. PATENT DOCUMENTS

| | | | |
|---|---|---|---|
| 3,786,384 A | | 1/1974 | Jones |
| 3,786,394 A | * | 1/1974 | Koenig et al. ............ 439/213 |
| 4,174,143 A | | 11/1979 | Hicks, Jr. et al. |
| 4,272,646 A | | 6/1981 | Carlson |
| 4,627,680 A | | 12/1986 | Weimer et al. |
| 4,728,752 A | * | 3/1988 | Hicks et al. ............ 174/88 R |
| 4,804,804 A | * | 2/1989 | Hibbert et al. ............ 174/16.2 |
| 4,842,533 A | | 6/1989 | Beberman et al. |
| 4,886,940 A | | 12/1989 | Gagnon et al. |
| 4,950,841 A | | 8/1990 | Walker et al. |
| 5,011,421 A | * | 4/1991 | Duke et al. ............ 439/213 |
| 5,261,830 A | | 11/1993 | Jego et al. |
| 5,760,339 A | * | 6/1998 | Faulkner et al. ............ 174/88 B |
| 7,862,356 B1 | * | 1/2011 | O'Leary et al. ............ 439/213 |
| 2005/0233625 A1 | * | 10/2005 | Faulkner ............ 439/210 |
| 2011/0132635 A1 | * | 6/2011 | Lesieur et al. ............ 174/68.2 |

FOREIGN PATENT DOCUMENTS

| | | |
|---|---|---|
| GB | 992687 A | 5/1965 |
| GB | 2298969 A | 9/1996 |

OTHER PUBLICATIONS

Written Opinion corresponding to International Patent Application No. PCT/US2011/058202, European Patent Office, dated May 12, 2011, 4 pages.
International Search Report corresponding to International Patent Application No. PCT/US2011/058202, European Patent Office, dated May 12, 2011, 4 pages.
Written Opinion corresponding to International Patent Application No. PCT/US2010/058212, European Patent Office, dated May 12, 2011, 4 pages.
International Search Report corresponding to International Patent Application No. PCT/US2010/058212, European Patent Office, dated May 12, 2011, 4 pages.

* cited by examiner

*Primary Examiner* — Gary F. Paumen

(57) ABSTRACT

A joint pack includes one or more phase members that utilize integrated standoff spacers that protrude and come into contact with opposing conductor plates to maintain a phase space between the phase members. The spacers are located along the insulating plates of the phase members away from the phase member's axial sleeves and protrude through apertures in the conductor plates disposed on the phase members, in which the standoff spacers also provide a barrier that prevents phase-conductors from being inserted too far within the phase space. The phase members include axial sleeves that fit within one another during assembly to form a nesting arrangement, thereby reducing the overall size of the joint pack while satisfying standards. The axial sleeves can be distinctively designed such that the phase members must be assembled in a predetermined order, with no components being omitted, to form the joint pack.

19 Claims, 12 Drawing Sheets

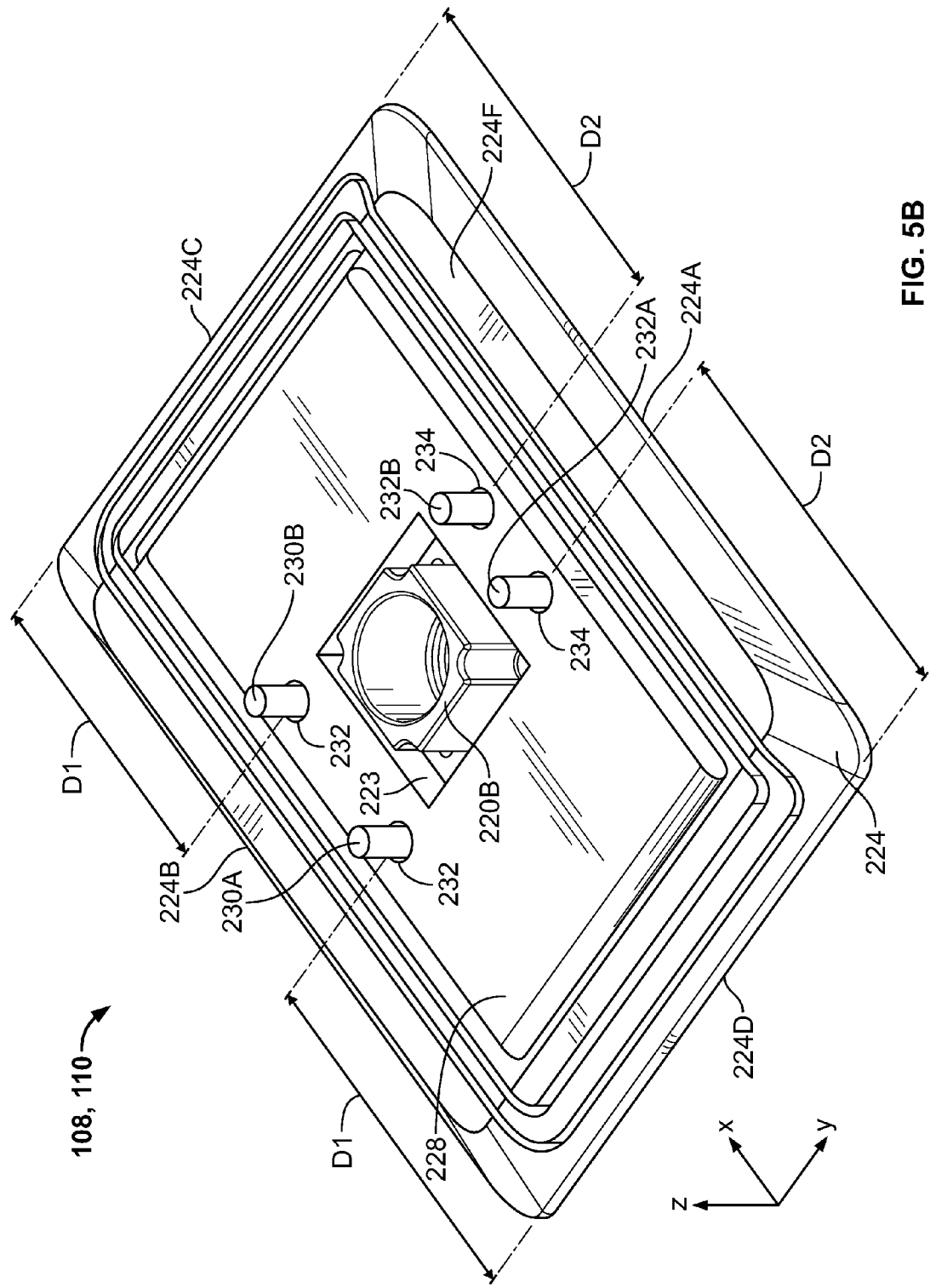

JOINT-PACK INTEGRATED SPACERS

TECHNICAL FIELD

The present disclosure relates generally to electrical distribution equipment and, more particularly, to a joint pack with integrated spacers.

BACKGROUND

A bus assembly system typically includes two or more bus assembly sections, one or more joint packs or bus assembly connectors, as well as a plurality of plug-in units. Each bus assembly section includes one or more phase-conductors and a housing. For example, in a three-phase system, the bus assembly section may include three live phase-conductors, or three live phase-conductors and one neutral-conductor, depending on the type of system architecture being employed. To draw power, various plug-in units or electrical components may be directly connected to one or more plug-in connection sites spaced along the bus assembly sections. Each joint pack is used to physically and electrically connect two sections or sets of bus assembly sections together.

A requirement in assembling a joint pack is that all of the required phase members which make up the joint packs must be assembled correctly and in the correct order to ensure that the joint pack will operate effectively. Many existing joint packs include discrete spacer standoffs that are inserted between phase members to ensure that the required spacing between the phase members is satisfied. However, these spacer standoffs are additional components that are not part of the phase members themselves, and one common problem is that such spacers may be inadvertently omitted during the assembly of the joint pack. This omission may prove costly as the joint pack will not operate effectively if one or more spacers are left out during assembly.

A common problem in assembling such joint packs is that one or more phase members may be incorrectly oriented with respect to the other phase members. Another common problem is that a conductor plate of one or more phase members may be placed at the incorrect phase location (i.e. phase A, B, or C) when assembling the joint pack. Another problem occurs when a portion of a phase member, such as a conductor plate, is inadvertently omitted when assembling the joint pack. These types of errors may cause the joint pack to not able to be installed in a bus assembly system.

Yet another problem occurs when the existing joint pack is decreased in size to make the overall size of the joint pack more compact. In particular, as a result of decreasing the sizes of the individual phase spaces within the joint pack, an unintended change may occur in the amount of creepage and/or through-air clearance that occurs between the phase members, thereby rendering the joint pack no longer satisfactory for the particular creepage and clearance guideline standards for which it is intended to be used.

Thus, a need exists for an improved joint pack that satisfies one or more of these needs and solves these problems.

SUMMARY

The present disclosure is directed to a joint pack that includes one or more phase members, which utilize integrated standoff spacers that protrude and come into contact with opposing conductor plates to maintain a phase space between the phase members. The spacers are molded with the insulating plates located along either or both of the insulating plates away from the phase member's axial sleeves. The spacers protrude through apertures in the conductor plates disposed on the phase members, in which the standoff spacers can also provide a barrier that prevents phase conductors of bus assembly sections from being inserted too far within the phase space. The phase members include axial sleeves that fit within one another during assembly to form a nesting arrangement, thereby reducing the overall size of the joint pack while satisfying standards. The axial sleeves can be distinctively designed such that the phase members must be assembled in a predetermined order, with no components being omitted, to form the joint pack. The axial sleeve can be designed to prevent or limit rotation of any of the phase members about a center axis of the joint pack.

The foregoing and additional aspects of the present disclosure will be apparent to those of ordinary skill in the art in view of the detailed description of various aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 5B illustrates a perspective view of the second opposed surface of the intermediate phase member in FIG. 5A;

DETAILED DESCRIPTION

Although the subject matter will be described in connection with certain aspects, it will be understood that the subject matter described herein is not limited to those particular aspects. On the contrary, the inventive subject matter is intended to cover all alternatives, modifications, and equivalent arrangements as may be included within the spirit and scope as defined by the appended claims.

Figure 1:
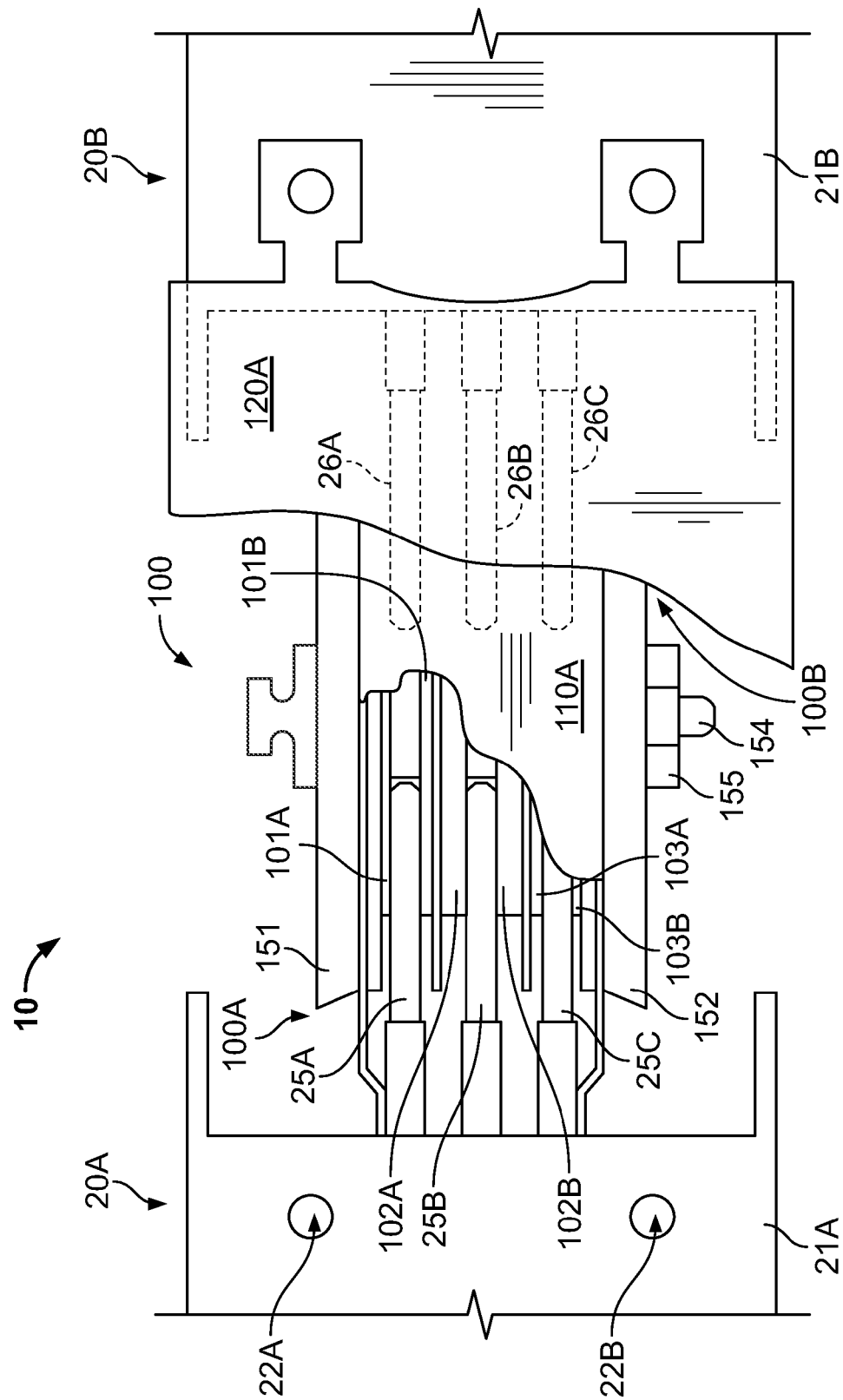
FIG. 1 illustrates a partially broken view of an overall bus assembly system according to one or more aspects of the present disclosure.

Referring to FIG. 1, an exemplary bus assembly system 10 is shown. The bus assembly system 10 includes a joint pack 100, a first bus assembly section 20A, and a second bus assembly section 20B. The first and the second bus assembly sections 20A, 20B are three pole bus assemblies and/or three phase bus assemblies. The first bus assembly section 20A includes a bus assembly housing 21A and three phase-conductors 25A-25C. Each of the phase-conductors 25A-25C are electrically insulated from each other and the housing 21A. Each of the phase-conductors 25A-25C has at least one exposed end configured to physically and electrically mate with a first end 100A of the joint pack 100, as shown in FIG. 1. It should be noted that the phase conductors 25A-25C can be removable from the joint pack 100.

Similarly, the second bus assembly section 20B includes a bus assembly housing 21B and three phase-conductors 26A-26C. Each of the phase-conductors 26A-26C is electrically insulated from each other and from the housing 21B. Each of the phase-conductors 26A-26C has at least one exposed end configured to removably mate with a second opposing end 100B of the joint pack 100 in the same manner as the three phase conductors 25A-25C mate with the first end 100A. The joint pack 100 is configured to electrically connect the first bus assembly section 20A and the second bus assembly section 20B when both are physically engaged with the joint pack 100. For example, the first phase-conductor 25A of the first bus assembly section 20A is electrically connected with the first phase-conductor 26A of the second bus assembly section 20B, and so on. Although the bus assembly sections and joint pack are shown to be for a three-pole system, a four-pole system in which of the bus assembly sections includes three phase-conductors and one neutral-conductor (not shown) is contemplated.

Figure 2:
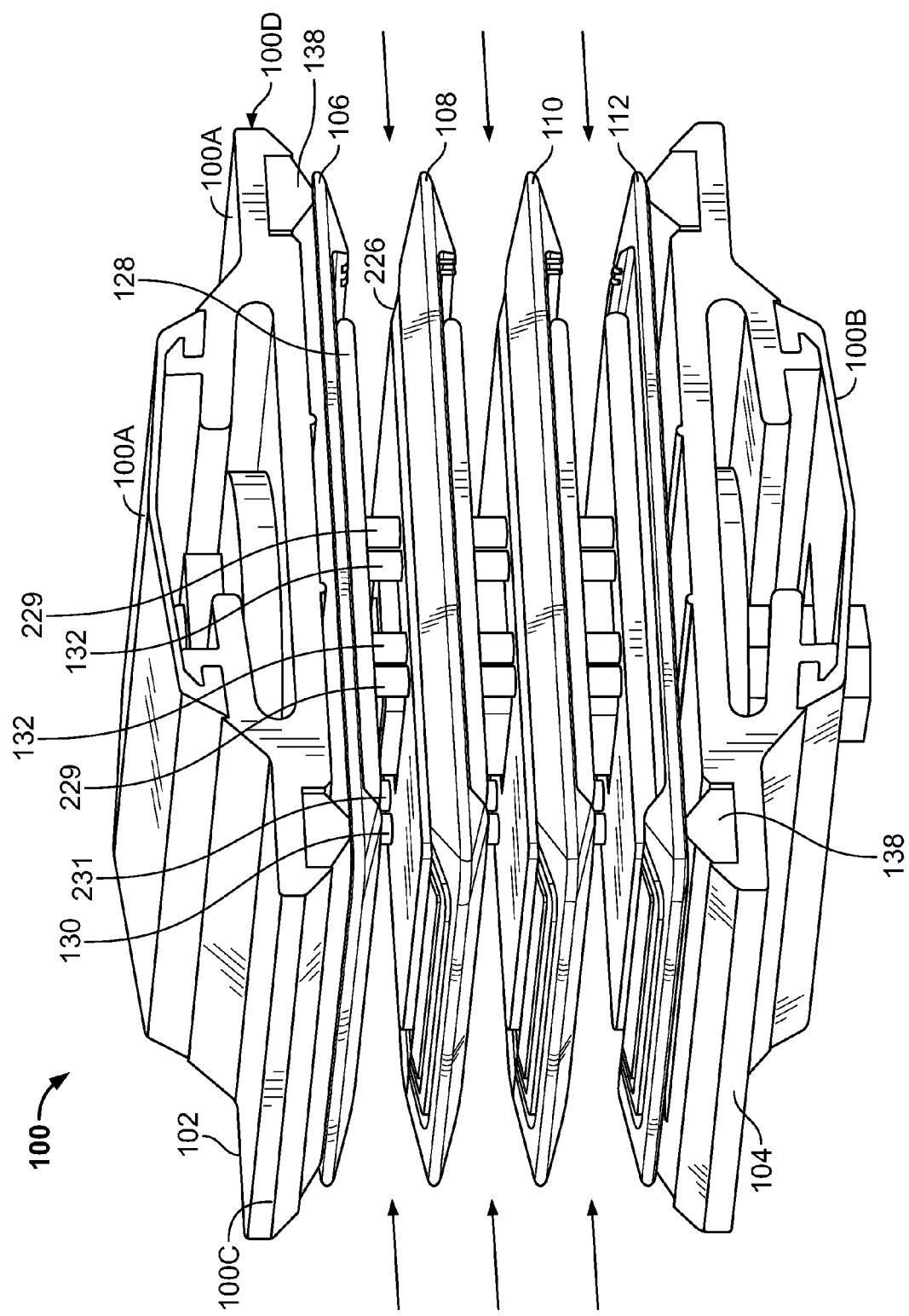
FIG. 2 illustrates a perspective view of a joint pack in accordance with one or more aspects of the present disclosure.

Referring generally to FIGS. 1 and 2, the joint pack 100 is shown according to an exemplary configuration of the present disclosure. The joint pack 100 is a multi-phase joint pack, and more particularly, a three-phase joint pack. The joint pack 100 is generally cube-shaped having a top end 100A and an opposing bottom end 100B, a first side 100C, and a second opposing side 100D. A top joint pack cover 102 is located at the top end 100A and a bottom joint pack cover 104 is located at the bottom end 100b of the joint pack 100.

Figure 3:
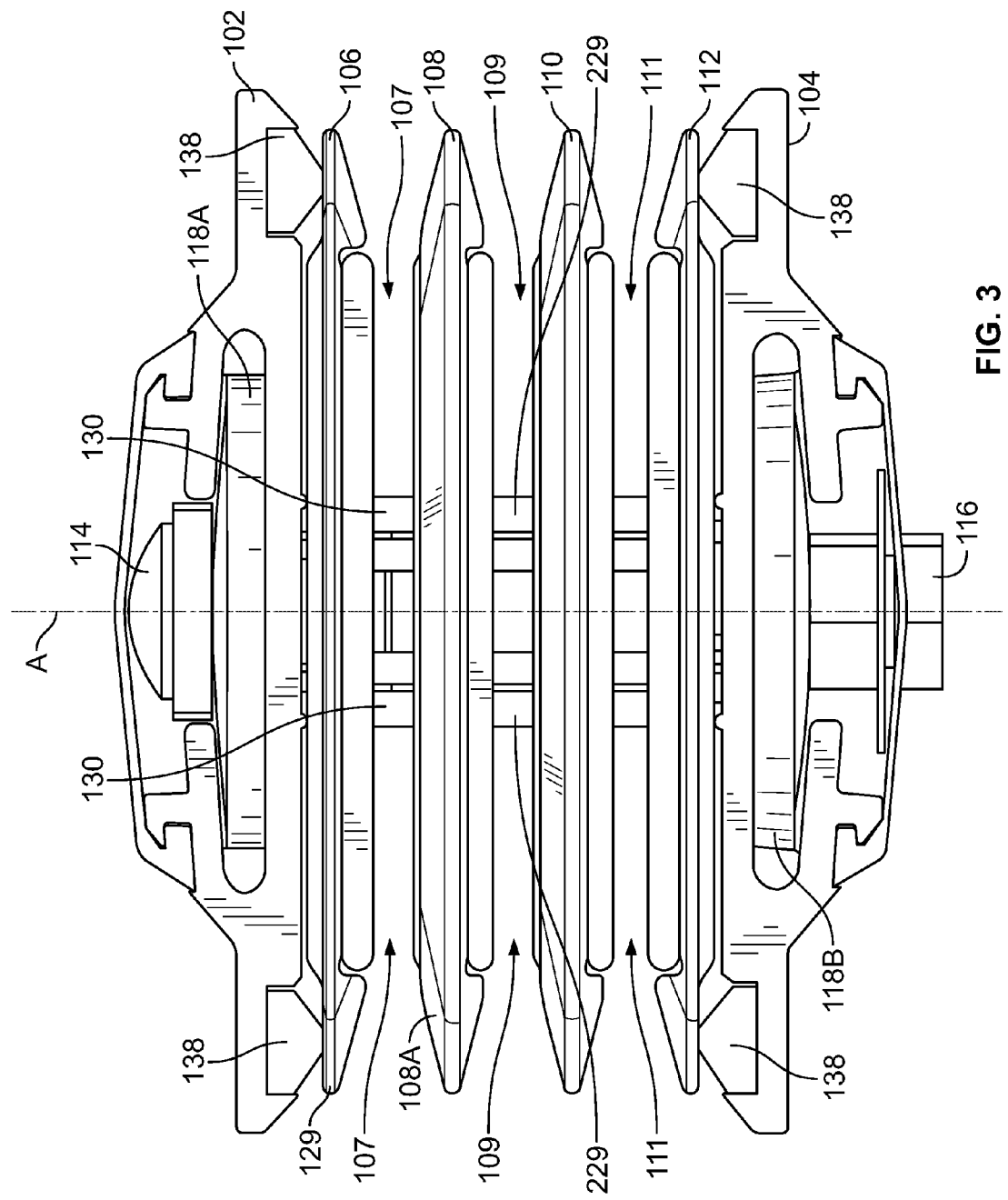
FIG. 3 illustrates a side view of the joint pack in FIG. 2 in accordance with one or more aspects of the present disclosure.

FIG. 3 illustrates a side view of the joint pack in FIG. 2 in accordance with one or more aspects of the present disclosure. As shown in FIG. 3, the joint pack 100 includes a plurality of phase members 106, 108, 110, 112 coupled to one another and vertically stacked along an axis A between the top joint pack cover 102 and the bottom joint pack cover 104. In particular, an optional ground phase member 106 is located immediately below the top joint pack cover 102, as shown in FIGS. 2 and 3. Additionally, a ground phase member 112 is positioned immediately above the bottom joint pack cover 104, as shown in FIGS. 2 and 3. Additionally, one or more intermediate phase members 108, 110 are located between the ground phase members 106 and 112, as shown in FIGS. 2 and 3. The intermediate phase member is referred to herein as an insulator plate with an centrally located axial sleeve and a conductor plate disposed on opposing sides of the insulator plate. The phase elements 106, 108, 110, 112 are oriented lengthwise along respective parallel planes that are substantially perpendicular to the direction of axis A.

The phase members 106, 108, 110, 112 along with the top and bottom joint pack covers 102, 104 are secured to one another with a bolt 114 and a nut 116, in which the bolt 114 extends through the central apertures extending through the axial sleeves of the phase members, as discussed below. Additionally, a washer (e.g. a Belleville washer) 118A is positioned between the head of the bolt 114 and the top joint pack cover 102. Similarly, another washer (e.g. a Belleville washer) 118B is positioned between the bottom joint pack cover 102 and the nut 116. It is contemplated that other fasteners and/or washers can be alternatively used. While the joint pack 100 is shown as having a certain number, type, and size of phase members and other components, various other numbers, types, and sizes of phase members and/or other components are contemplated.

In an aspect, the phase members 106, 108, 110, 112 are vertically stacked along the axis A and are vertically separated by one or more integrated spacers or standoffs discussed below. In other words, the standoffs positioned between each of the phase members 106, 108, 110, 112 provide and maintain spaces that correspond to designated electrical phases of the joint pack 100 (hereinafter referred to as "phase spaces"). In particular, phase space 107 is located between opposing phase members 106 and 108; whereas phase space 109 is located between opposing phase members 108 and 110; and phase space 111 is located between opposing phase members 110 and 112. In the aspect shown in FIG. 3, the phase space 107 corresponds to phase A, whereas phase space 109 corresponds to phase B, and phase space 111 corresponds to phase C. Each of the phase spaces 107, 109 and 111 allows a respective phase-conductor of a bus assembly, such as one of the phase-conductors 25A-25C, 26A-26C shown in FIG. 1, to be slidably inserted therein to allow electrical communication between the phase conductors of the bus assembly sections.

Figure 4A:
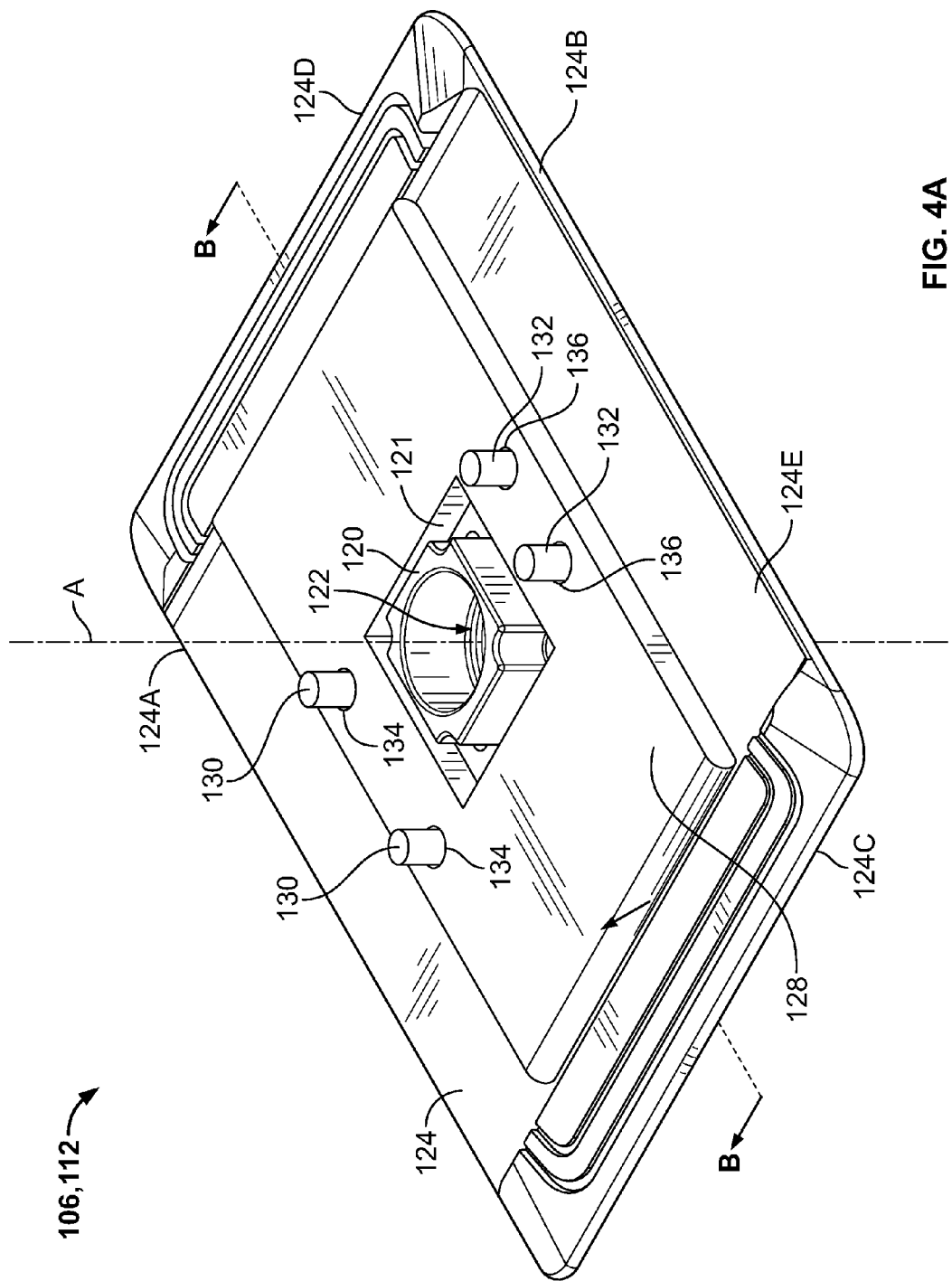
FIG. 4A illustrates a perspective view of a ground phase member in accordance one or more aspects of the present disclosure.
Figure 4B:
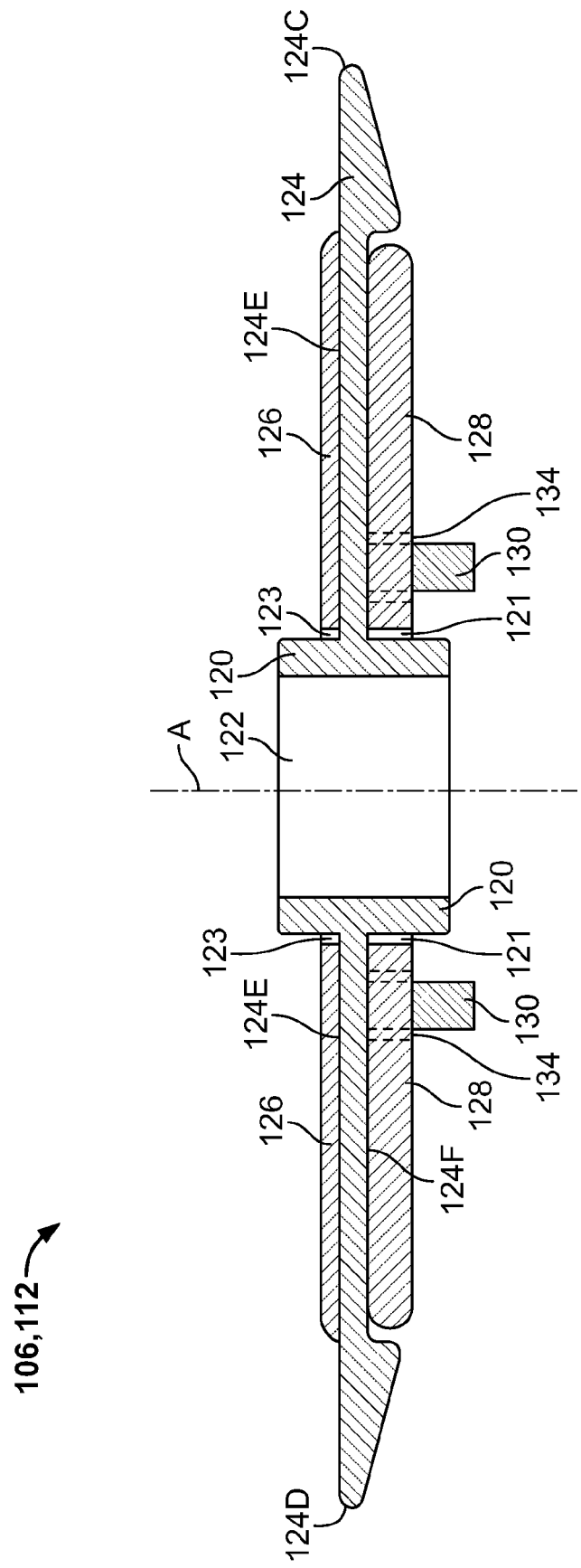
FIG. 4B illustrates a cross sectional end view of the ground phase member shown in FIG. 4A along line B-B.
Figure 4C:
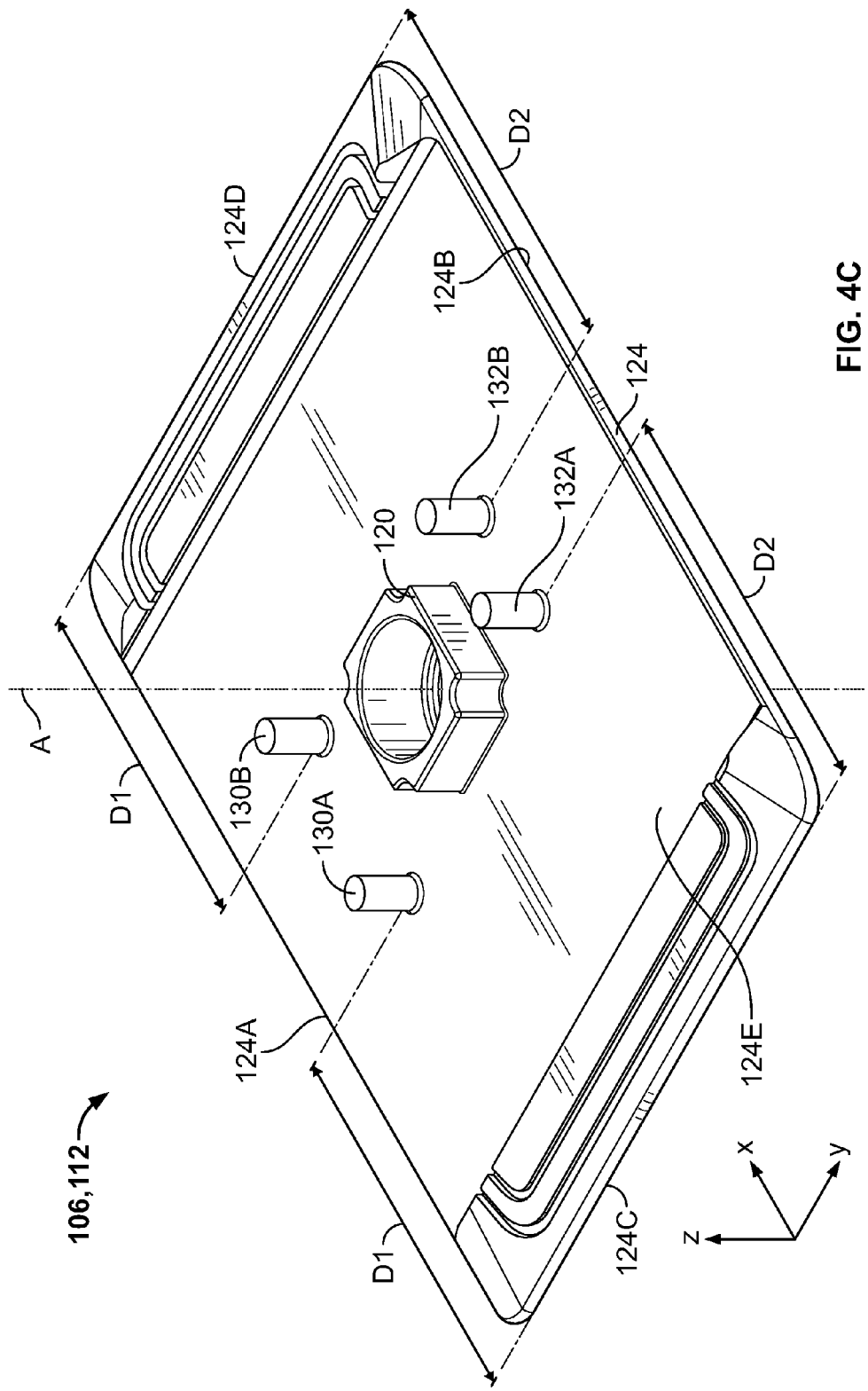
FIG. 4C illustrates a perspective view of an insulated plate of the ground phase member in FIG. 4A.

Details of the phase members will now be discussed. FIGS. 4A-4C illustrate differing views of the ground phase member 106. It should be noted that although the following description is directed toward and discussed in light of the ground phase member 106, the same applies to the ground phase member 112 (see FIG. 3). As shown in FIGS. 4A-4C, the ground phase member 106 includes an insulator plate 124 having a generally flat rectangular shape along with an axial sleeve 120 made of an insulator material that protrudes perpendicular with the insulator plate 124 in the direction along the axis A. As shown in FIGS. 4A and 4B, the axial sleeve 120 includes a central aperture 122 that extends therethrough along the axis A. In an aspect of the present disclosure, the insulator plate 124 is formed such that the axial sleeve 120 is integral with the rest of the plate 124 and thus is considered as one piece. In another aspect, the insulator plate 124 and the sleeve 120 are separately formed components which are coupled to one another to assemble the ground phase member 106.

It should be noted that although the sleeve 120 is shown in FIGS. 4A and 4B as extending from only one side of the insulator plate 124, it is contemplated that the sleeve 120 extends vertically along axis A on the opposing side of the insulator plate as well, as indicated in FIG. 4B. In an aspect, the sleeve 120 has a poka yoke configuration, whereby portions of the sleeve 120 are distinctly shaped to interface only with an axial sleeve of another predetermined phase member. A poka-yoke configuration is referred to herein as a mechanism configuration used in a manufacturing or assembly process that helps an equipment operator avoid mistakes and eliminate product defects by preventing, correcting, or drawing attention to human errors as they occur. More details of the poka yoke configuration are described below.

As shown in FIG. 4A, the insulator plate 124 includes a first side 124A and a second opposing side 124B as well as a first edge 124C and a second opposed edge 124D. Additionally, the insulator plate 124 has a top surface 124E and a bottom surface 124F, both of which extend between the sides 124A-124B and the ends 124C-124D. The top and bottom surfaces 124E, 124F each receive a conductor plate thereon. The one or more conductor plates electrically connect the bus assembly connector to the bus assembly sections described above. In particular, conductor plate 126 (FIG. 4B) is shown disposed on the top surface 124E whereas conductor plate 128 is shown disposed on the bottom surface 124F of the insulator plate 124. Each of the conductor plates 126, 128 has a generally rectangular cross-section and a central aperture 121 that surrounds the sleeve 120. In an aspect, the conductor plate 128 includes a plurality of apertures 134, 136 that extend through the plate 128 and are configured to receive the integrated standoff spacers such that the standoff spacers protrude above the conductor plate, as discussed below. As shown in FIG. 4A, the apertures 134, 136 (and thus the standoff spacers) are positioned a predetermined distance away from the axial sleeve and are thus are not located on the axial sleeve themselves.

FIG. 4C illustrates a perspective view of the grounded insulator plate without a conductor plate thereon. In particular, as shown in FIG. 4C, the grounded insulator plate 124 includes a first set of integrated standoff spacers 130 and a second set of integrated standoff spacers 132 that vertically protrude from surface 124E in a direction parallel to the axis A. The integrated standoff spacers 130, 132 are molded with the insulator plate 124 and are formed integrally with the plate 124 when the plate 124 is manufactured. The standoff spacers 130, 132 have a cylindrical profile and are circular in cross-sectional shape in the aspects shown herein. However, it is contemplated that the standoff spacers can have other polygonal or non-polygonal shapes and profiles, and thus are not limited to those shown herein. For example, the standoff spacer can be a rectangular block that protrudes from the insulator plate 124 and has a length dimension equivalent of the dimensional space between standoff spacers 132 in FIG. 4C. It should be noted that although there are two standoff spacers for each set as shown in FIGS. 4A-4C, more or less than two standoff spacers in a set (and corresponding conductor plate apertures) are contemplated.

As in FIG. 4C, the first set of standoff spacers 130A, 130B is located proximal to the first side 124A and distal to the second side 124B. A second set of standoff spacers 132A, 132B is located proximal to the second side 124B and distal to the first side 124A. In the example, the first set of standoff spacers 130 are spaced apart by a distance different than that of the second set of spacers 132. In particular, standoff spacer 130A is spaced along the x-direction a distance D1 from the first edge 124C, and standoff spacer 130B is spaced along the x-direction the distance D1 from the second edge 124D. Additionally, the standoff spacer 132A is spaced along the x-direction a distance D2 from the first edge 124C, and standoff spacer 132B is spaced along the x-direction the distance D2 from the second edge 124D. In the example shown in FIG. 4C, distance D2 is shown to be greater than the distance D1, thereby placing the spacers 132A, 132B closer to one another than spacers 130A, 130B. It is contemplated that the standoff spacers are laterally positioned a predetermined distance away from the axial sleeve 120 in the x-direction and/or y-direction. It should be noted that the locations and distances of the standoff spacers 130, 132 are only exemplary and thus are not limited to those shown in the Figures. As mentioned above, it is possible that only one set of standoff spacers be utilized on the insulator plate in an aspect of the present disclosure.

As discussed above, the conductor plate 128 includes two pairs of apertures 134, 136, whereby standoff spacers 130 respectively extend through apertures 134, and standoff spacers 132 respectively extend through apertures 136 when the conductor plate 128 is seated on the surface 124E of the insulator plate 124. In addition, the use of the standoff spacers through the apertures in the conductor plate prevents the conductor plate from freely rotating around the axial sleeve about the axis A. Additionally, as shown in FIGS. 4A and 4B, the standoff spacers 130, 132 each have a substantially similar height dimension, such that the ends of the spacers 130, 132 come into and remain in contact with a facing conductor plate of a vertically adjacent phase member, as will be discussed in more detail below. In an aspect, the height distance at which the standoff spacer extends, with respect to its originating surface, is slightly less than the thickness of the phase conductors (25A-25C, 26A-26C) of the bus assembly sections. This distance will ensure that the standoff spacers do not prevent the conductor plates from being clamped into firm contact with the ends of the phase conductors (25A-25C, 26A-26C).

The location of standoff spacers 130A, 130B along the x-direction advantageously allow the standoff spacers 130A, 130B to function as barriers to the phase conductors (i.e. 25A-25C, 26A-26C) as the phase conductors are slidably inserted between opposing phase members 106, 108, 110, 112. This arrangement is shown in more detail in FIG. 3, where standoff spacers 130 in space 107 are distanced to act as a barrier to an inserted phase conductor and thus prevent the phase conductor from being pushed past a desired distance from the end of the phase member.

Figure 5A:
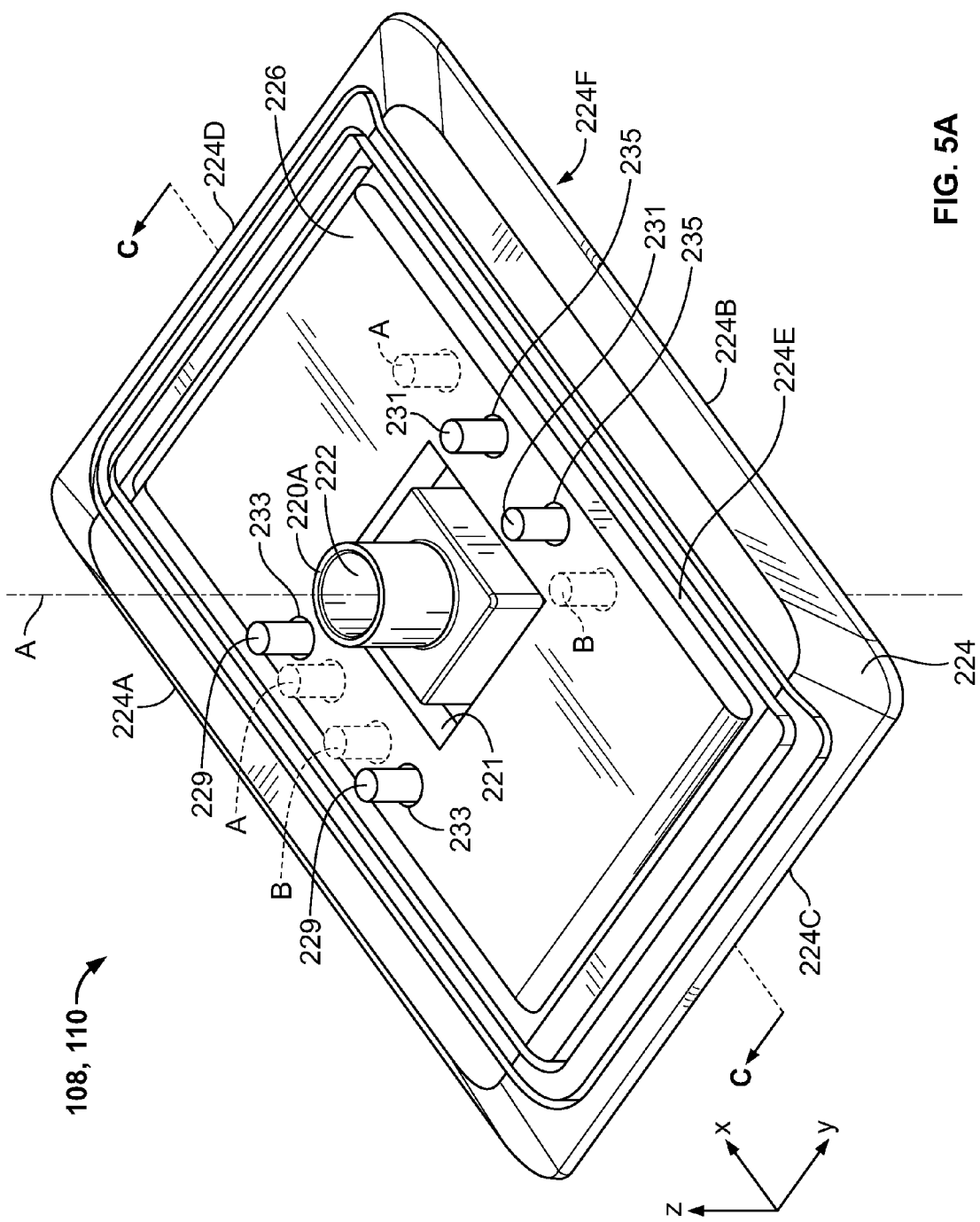
FIG. 5A illustrates a perspective view of a first surface of an intermediate phase member in accordance with one or more aspects of the present disclosure.
Figure 5C:
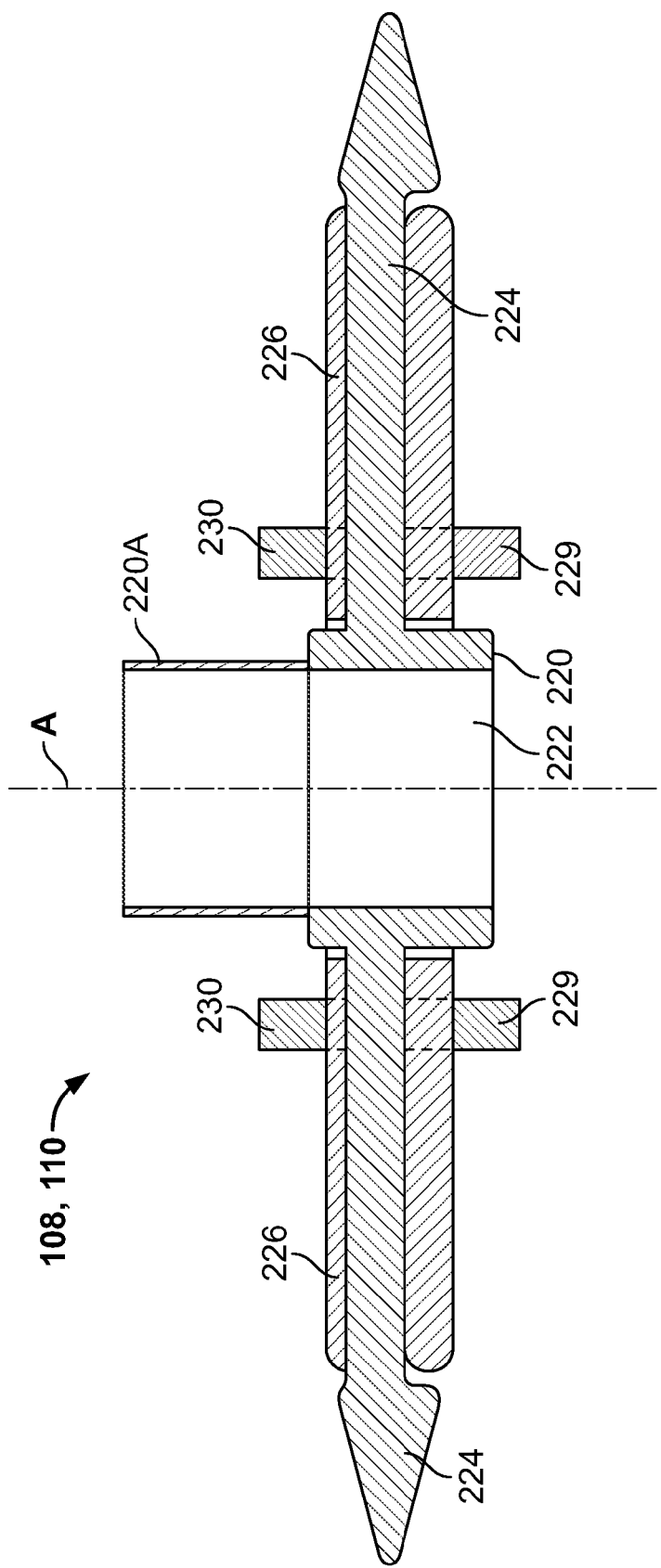
FIG. 5C illustrates a cross sectional end view of the intermediate phase member shown in FIG. 5A along line C-C.

FIGS. 5A-5C illustrate differing views of the intermediate phase member 108 in an aspect of the present disclosure. In particular, FIG. 5A illustrates a top perspective view of the intermediate phase member 108 whereas FIG. 5B illustrates a bottom perspective view of the intermediate phase member 108. It should be noted that although the following description is directed toward the intermediate phase member 108, the same applies to the intermediate phase member 110 (see FIG. 3). As shown in FIGS. 5A-5C, the intermediate phase member 108 includes an insulator plate 224 having a generally flat rectangular shape along with an axial sleeve 220A made of insulator material that protrudes perpendicularly with the insulator plate 224 in the direction along axis A. In an aspect, the insulator plate 224 is formed such that the axial sleeve 220A is integral with the rest of the plate 224 and thus is considered as one piece. In another aspect, the insulator plate 224 and the sleeve 220A are separately formed components that are coupled to one another to assemble the ground phase member 106.

It should be noted that the phase member 108 not only includes the sleeve 220A on one of the surfaces (as shown in FIG. 5A), but also includes the axial sleeve 220B on the opposing surface (as shown in FIG. 5B). In an aspect, although not necessary, the axial sleeves 220A, 220B have poka yoke configurations, whereby the sleeves 220A, 220B are distinctly shaped to interface only with an axial sleeve of one other predetermined phase member. More details of the poka yoke configurations are described below.

The insulator plate 224 includes a first side 224A and a second opposing side 224B as well as a first end 224C and a second opposed end 224D. Additionally, the insulator plate 224 has a top surface 224E and a bottom surface 224F, both of which extend between sides 224A-224B and ends 224C-224D. The top and bottom surfaces 224E, 224F each receive a conductor plate thereon, as shown in FIGS. 5A-5C. In particular, the conductor plate 226 is shown disposed on the surface 224E (FIG. 5A) whereas conductor plate 228 is shown disposed on the bottom surface 224F of the insulator plate 224 (FIG. 5B).

The conductor plate 226 (FIG. 5A) includes a central aperture 221 that surrounds the sleeve 220A and a plurality of apertures 233, 235 located adjacent to the central aperture 221. As shown in FIG. 5B, conductor plate 228 includes a central aperture 223 that surrounds the sleeve 220B and includes a plurality of apertures 232, 234 located adjacent to the central aperture 223.

As shown in FIG. 5A, the intermediate insulator plate 224 includes a set of integrated standoff spacers 229, 231 that vertically protrude in a direction parallel to the axis A from the surface 224E. In addition, the intermediate insulator plate 224 includes a set of integrated standoff spacers 230, 232 that vertically protrude parallel to the axis A from the surface 224F, as shown in FIG. 5B. The sets of integrated standoff spacers 230, 231, 232, 233 are molded with the insulator plate 224 and are formed integrally with the plate 224 when the plate 224 is manufactured. As shown in FIG. 5A, the integrated standoff spacers are laterally positioned a predetermined distance away from the axial sleeve in the x-direction and/or the y-direction and are thus are not located on the axial sleeve themselves.

The standoff spacers 229, 230, 231, 232 are each shown to have a cylindrical profile and are circular in cross-sectional shape. However, it is contemplated that the standoff spacers 229, 230, 231, 232 can have other polygonal or non-polygonal shapes and profiles, and thus are not limited to those shown herein. For example, one or more of the standoff spacers can be a rectangular block that protrudes from the insulator plate 224 and has a length dimension substantially identical to the dimensional space between standoff spacers 232 in FIG. 5B. It should be noted that although there are two standoffs for each set as shown in FIGS. 5A-5C, more or fewer than two standoffs in a set are contemplated.

In the example, the standoff spacers 130 are spaced apart by a distance different than that of standoff spacers 132. In particular as shown in FIG. 5B, standoff spacer 230A is spaced along the x-direction a distance D1 from the second end 224D, and standoff spacer 230B is spaced along the x-direction the distance D1 from the first end 224C. Additionally, the standoff spacer 232A is spaced along the x-direction a distance D2 from the second end 224D, and standoff spacer 232B is spaced along the x-direction the distance D2 from the first end 224C. In the example shown in FIG. 5B, distance D2 is shown to be greater than the distance D1, thereby placing the standoff spacers 232A, 232B closer to one another than spacers 230A, 230B. It should be noted that the locations and distances of the standoff spacers 230, 232 are only exemplary and thus are not limited to those shown in the Figures.

With regard to the opposing side of the intermediate phase member 108 shown in FIG. 5B, the same above description applies with respect to the spacings between the standoff spacers 229 and 231 along the x and y directions.

As shown in the example in FIG. 5A, the conductor plate 226 includes two pairs of apertures 233, 235, whereby standoff spacers 229 respectively extend through apertures 233 and standoff spacers 231 respectively extend through apertures 235 when the conductor plate 226 is seated on the surface 224E of the insulator plate 224. Similarly, as shown in FIG. 5B, the conductor plate 228 includes two pairs of apertures 232, 234, whereby standoff spacers 230A, 230B respectively extend through apertures 232 and standoff spacers 232A, 232B respectively extend through apertures 234 when the conductor plate 228 is seated on the surface 224F of the insulator plate 224. Additionally, in an aspect, the standoff spacers 229 and 231 have a substantially identical height dimension whereas standoff spacers 230 and 232 have substantially identical height dimensions, such that the ends of the standoff spacers 229, 230, 231, 232 come into and remain in contact with a facing conductor plate of a vertically adjacent phase member, as will be discussed in more detail below.

The location of standoff spacers 229 and 232 along the x-direction are advantageous in that they function as barriers or limit stops to the phase conductors (i.e. 25A-25C, 26A-26C) as the phase conductors are slidably inserted between opposing phase members 106, 108, 110, 112. For example, as shown in FIG. 3, standoff spacers 229 in the space 109 are positioned to operate as a barrier to an inserted phase conductor and thus prevent the phase conductor from being inserted too far into the joint pack 100. In addition, the use of the standoff spacers through the apertures in the conductor plate prevents or limits the conductor plate from freely rotating around the axial sleeve about axis A.

As mentioned above, the integrated standoff spacers have several functions. The integrated standoff spacers create and maintain the vertical space (i.e. phase) between adjacent phase members such that a phase conductor may be inserted within the vertical space. Upon adjacent phase members being coupled to one another, the integrated standoff spacers of a particular phase member come into and remain in contact with the conducting plate of the neighboring phase member to space the opposing conducting plates apart from one another. This is shown in FIG. 2, wherein the sets of standoff spacers 130 and 132 originating from ground phase member 106 (see FIG. 4A) are in contact with the conducting plate 226 of intermediate phase member 108. Similarly, in FIG. 2, sets of standoff spacers 229 and 231 originating from the intermediate phase member 108 are in contact with the conducting plate 128 of the ground phase member 106. Additionally, it should be noted that the location of the standoff spacers 132 as well as the distance between the two spacers 132 allow them to be positioned next to the spacers 229 originating from the intermediate phase member 108. Similarly, the location of the standoff spacers 231 as well as the distance between the two spacers 231 allow them to be positioned next to the spacers 130 originating from the ground phase member 106. The locations of standoff spacers 130 and 229 in FIG. 2 allow the spacers 130, 229 to act as barriers to the phase conductors as the phase conductors are slidably inserted (as shown by the arrows) into the joint pack. In addition, the use of the standoff spacers through the apertures in the conductor plate prevents the conductor plate from freely rotating around the axial sleeve on the insulator plate. Further, by maintaining contact with the opposing conductor plate, the integral standoff spacers maintain a constant force to keep the conductor plate in contact with the insulator plate, thereby preventing the conductor plate from "hanging down" off of the insulator plate under the influence of gravity (i.e. the conductor plate faces downward).

Figure 6:
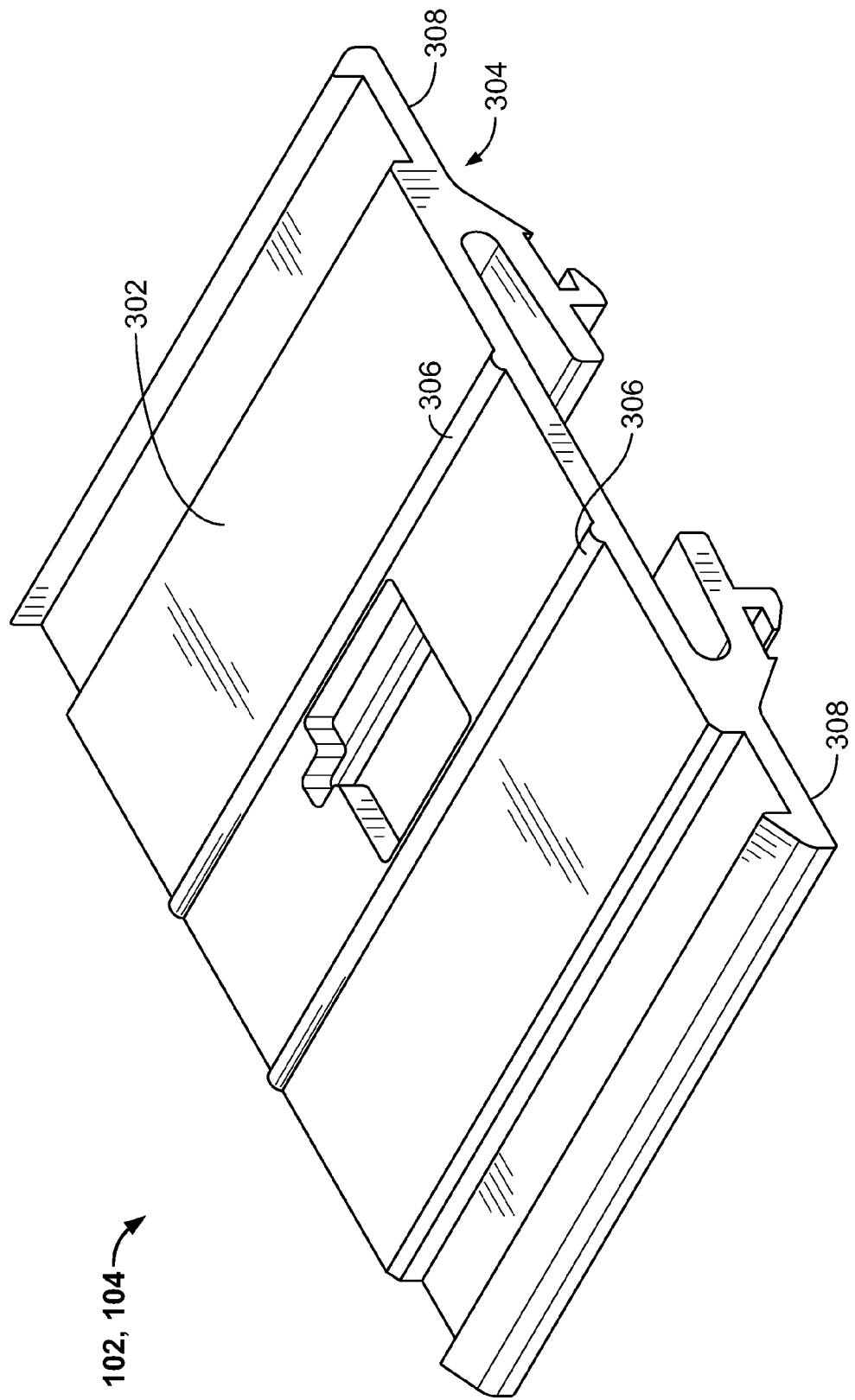
FIG. 6 illustrates a perspective view of a joint pack cover in accordance with one or more aspects of the present disclosure.

FIG. 6 illustrates a perspective view of a joint pack cover in accordance with an aspect of the present disclosure. Although not necessary, it is desired that the same joint pack cover be used as the top joint pack cover 102 as well as the bottom joint pack cover 104 in the joint pack 100. As shown in FIG. 6, the joint pack cover 102, 104 includes a first surface 302 and a second opposing surface 304. As shown in FIGS. 2 and 3, for a joint pack cover being used as the top joint pack cover 102, the first surface 302 faces downward toward the ground phase member 106 and the second surface 304 faces upward in the opposing direction. For the joint pack cover being used as the bottom joint pack cover 104, the first surface 302 faces upward toward the ground phase member 112 and the second surface 304 faces downward in the opposing direction.

The first surface 302 of the joint pack cover 102, 104 includes one or more ribs 306 protruding therefrom, whereby the ribs 306 remain in contact with the facing conductor plates of the vertically adjacent phase members 106, 112. As shown in FIGS. 3 and 6, the joint pack cover 102, 104 includes two ribs 306, although more or less than two ribs are contemplated. The ribs 306 maintain spacing between the vertically adjacent conductor plate of the ground member and the joint pack cover to prevent any electrical contact therebetween. The joint pack cover 102, 104 may also include a pair of insulated gaskets 138 that are located proximal to outer ends of the cover 102, 104. The gaskets 138 are dimensioned to remain in contact with the ground phase members 106, 112 and prevent movement or wobbling of the members 106, 112 as well as prevent contaminants from entering the joint pack. Also, the gaskets 138 maintain the spacing between any part of the ground phase member 106, 112 and the joint pack cover 102, 104. It should be noted that the ribs 306 shown in FIG. 6 are an example configuration and any other shaped polygonal or non-polygonal shapes are contemplated. For example, the ribs 306 can be substituted with one or more individualized protruding bums. It should also be noted that the joint pack 102, 104 can include either or both of the ribs and gaskets. The ribs can be extruded into the joint pack covers.

The integrated standoff spacers are molded into the desired surfaces of the insulator plate. This may be done by punching, stamping, or injection molding processes. The conductor plates 126, 128, 226, 228 can be made of any electrically conducting material, such as, for example, copper, gold, iron, and the like. The insulating plates 106, 108, 110, 112 electrically insulate the A, B, and C phases from one another. The first and the second insulating plates 106 and 108 electrically insulate phase A from the other phases and ground. The second and the third insulating plates 108 and 110 electrically insulate phase B from the other phases. The third and the fourth insulating plates 110 and 112 electrically insulate phase C from the other phases and ground. The insulating plates 106, 108, 110, 112 may be made of any electrically insulating material, such as, for example, plastic, rubber, polyvinyl chloride (PVC), bulk molded compound or thermoset, and the like.

Figure 7:
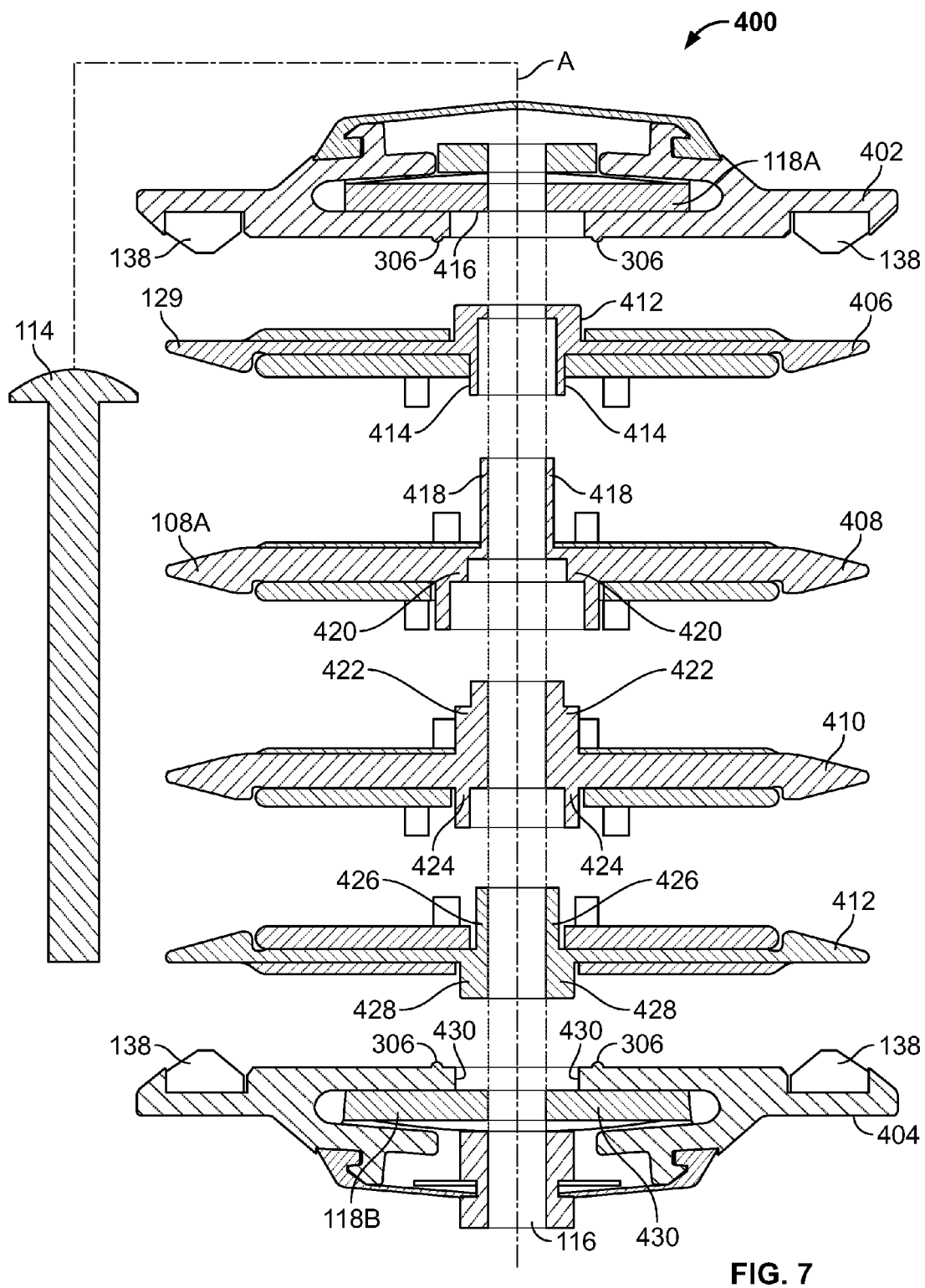
FIG. 7 illustrates an exploded cross sectional view of a joint pack cover in accordance with one or more aspects of the present disclosure.

FIG. 7 illustrates an exploded cross-sectional view of a joint pack 400 having phase members with poka yoke features in accordance with an aspect of the present disclosure. As will be discussed below, the phase members 406, 408, 410, 412 have axial sleeves made of insulator material, whereby an axial sleeve nests into another axial sleeve and achieves a rated dielectric clearance. As shown in FIG. 7, each of the phase members 406, 408, 410, 412 includes axial sleeves that are distinctly different from one another such that each axial sleeve will only fit and mate with the axial sleeve of one other predetermined phase member. In an aspect, it is contemplated that all of the phase members and joint pack covers be utilized in assembling the joint pack 400. It should be noted that although the joint pack can utilize the poka yoke features, it is contemplated that the poka yoke features be incorporated into the joint pack with integral standoff pacers discussed above.

As discussed above, each phase member 406, 408, 410, 412 includes an axial sleeve that extends in a vertical direction with respect to the planar insulating plate, whereby each axial sleeve includes a top interface area and a bottom interface area. In particular, the ground phase member 406 includes an axial sleeve with a top interface 412 and a bottom interface 414. The intermediate phase member 408 includes an axial sleeve with a top interface 418 and a bottom interface 420. The intermediate phase member 410 includes an axial sleeve with a top interface 422 and a bottom interface 424. The ground phase member 412 includes an axial sleeve with a top interface 426 and a bottom interface 428.

In the example shown in FIG. 7, the top interface 412 of the ground phase member 406 has a cross-sectional shape distinctly different than the top or bottom interfaces of any of the other phase members 406, 408, 410, 412 in the joint pack 400. In addition, the cross-sectional shape and dimension of the top interface 412 is such that it will only fit within a correspondingly receiving aperture 416 of the joint pack cover 402. In other words, the configuration of the ground phase member's top interface 412, as well as the corresponding receiving aperture 416 of the joint pack cover 402 requires that the top interface 412 be inserted into the aperture 416 of cover 402.

Similarly, the distinctive cross-sectional shape and dimensions of the bottom interface 414 of intermediate phase member 408 is such that it will only receive the top interface 418 of the intermediate phase member 408. In other words, one who attempted to insert the top interface 422, the bottom interface 424 or any other interface (except for interface 418) into the interface 414 would find that the intermediate phase member 408 would not mate and/or couple with those other interfaces. Thus, considering that the top interface 418 mirrors the contour, shape and dimensions of the bottom interface 414, these two predetermined interfaces are to be coupled to one another in assembling the joint pack.

In addition to the protruded top interface 418 of the intermediate phase member 408, the phase member 408 includes a stepped bottom interface 420. As can be seen in FIG. 7, the stepped configuration of the bottom interface 420 is distinctly different than any of the other top and bottom interfaces, except for top interface 422 that mirrors the stepped configuration of bottom interface 420. Thus, the stepped bottom interface 420 of the phase member 410 mates with the stepped bottom interface 420 of intermediate phase member when the phase member 410 is stacked under phase member 408 in assembling the joint pack 400.

As shown in FIG. 7, the bottom interface 424 of the intermediate phase member 410 has a protrusion and a notched receiving area, whereby the notched receiving area has a distinctive configuration and dimension that allows only the top interface 426 of the ground phase member 412 to be inserted therein to couple the two phase members together. Additionally, the bottom interface 428 of the ground phase member 412 has a shape and dimension that is distinctively different than any of the other top or bottom interface. In particular, the bottom interface 428 is shaped only to fit within the aperture 430 of the joint pack cover 404 when the joint pack 400 is assembled.

As discussed above, each of the axial sleeves has top and bottom interfaces that are distinctive in shape and mirrors the top or bottom interface of another phase member, such that the each top and bottom interface couples to the mirror shaped interface of a predetermined phase member to form the joint pack. Further, the interfaces are designed that one or more phase members cannot be omitted in assembling the joint pack 100 as the components will not securely fasten together. It should be noted that the above description in FIG. 7 is only exemplary to show the effectiveness of the poka yoke features incorporated by the joint pack, and it is contemplated that any combination of shapes, dimensions, order of parts, number of parts may be utilized in achieving the poka yoke features without being limiting to the discussion herein.

As stated above, the coupling of the insulated axial sleeves of the individual phase members provides for a nested dielectric insulator that extends between the ground phase member 406 and the ground phase member 412. In particular, each axial sleeve is made of an insulating material that is rated to meet dielectric performance requirements. Since each axial sleeve at least partially interlocks or nests inside one another, the combined shapes create a dielectric through-air clearance and over-surface creepage path such that the joint pack 400 operates within the requirement measurements for dielectric performance.

Figure 8A:
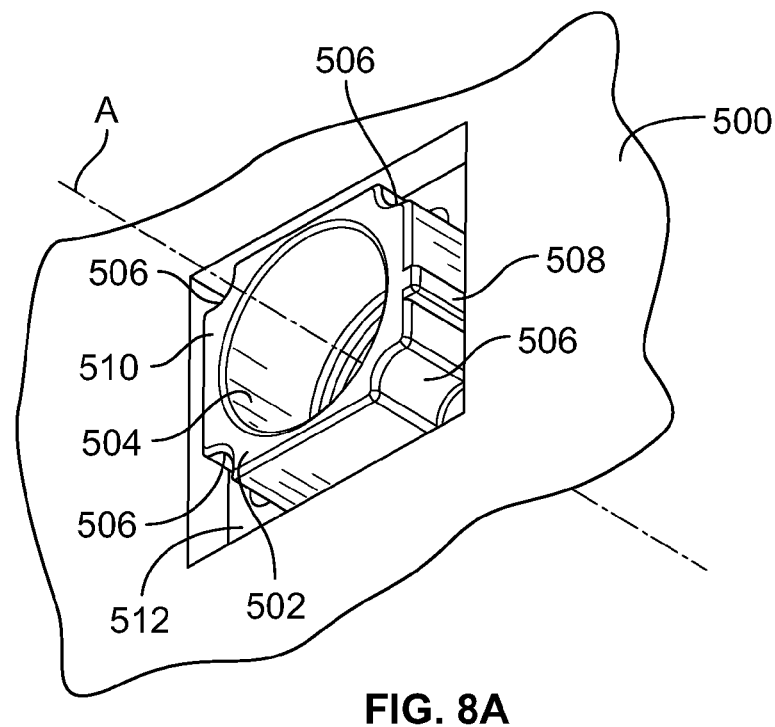
FIG. 8A illustrates a perspective view of an axial sleeve of a phase member in accordance with one or more aspects of the present disclosure.
Figure 8B:
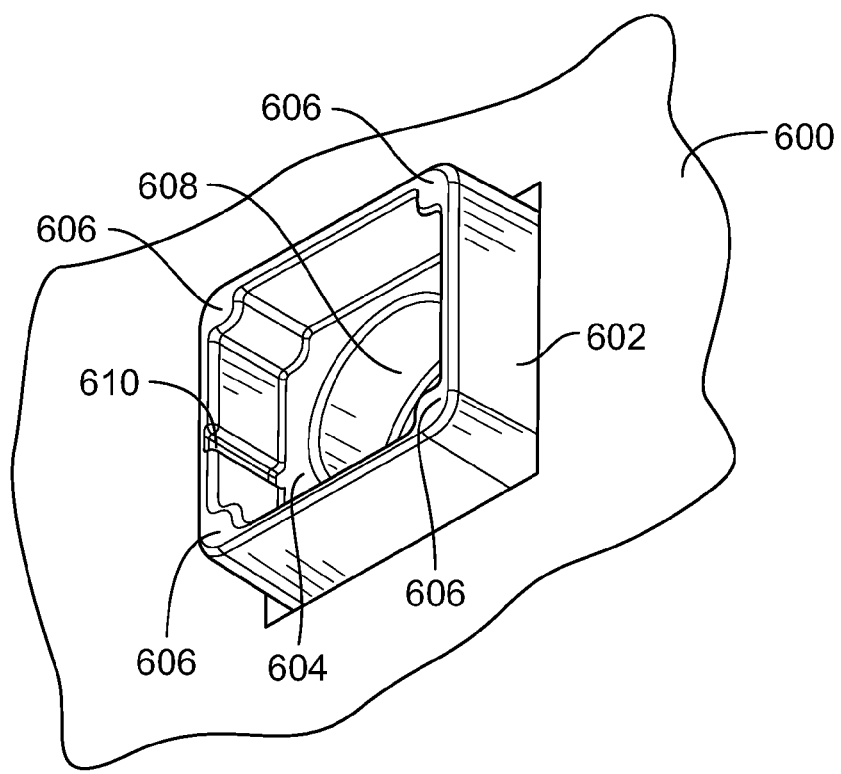
FIG. 8B illustrates a perspective view of an axial sleeve of a corresponding phase member which couples with the axial sleeve shown in FIG. 8A in accordance with one or more aspects of the present disclosure.

FIG. 8A illustrates a perspective view of an axial sleeve of a phase member in accordance with an aspect of the present disclosure. FIG. 8B illustrates a perspective view of an axial sleeve of a corresponding phase member that couples with the axial sleeve shown in FIG. 8A in accordance with an aspect of the present disclosure. As shown in FIG. 8A, the axial sleeve 502 of a phase member 500 includes a body with a central aperture 504 extending from the top surface 510 of the body through the sleeve 502 along axis A to accommodate insertion of the bolt 114, as described above. The sleeve 502 includes curved notches 506 located at each of the corners of the portion 502 as well as one or more protrusions 508 that runs vertically along the side of the portion 502 from a top surface 510 to a bottom surface 512. The shown sleeve 502 can be either a top interface or bottom interface (depending on the orientation of the phase member 500) and is configured to mate with a predetermined interface of another phase member, namely phase member 600 shown in FIG. 8B, to couple phase members 500 and 600 to one another.

In particular, the phase member 600 in FIG. 8B includes an axial sleeve 602 in the shape of a square receptacle 604 defined within the walls, whereby the receptacle 604 is in communication with a central aperture 608 that extends through the phase member 600 along axis A and accommodates insertion of the bolt 114, as described above. In addition, the sleeve 602 includes four curved protrusions 606 at each of the corners of the sleeve 602 as well as a keyed slot 610 located on an inside surface of the sleeve 602, as shown in FIG. 8B.

As stated above, the example sleeves in FIGS. 8A-8B emphasize the mirrored interfaces of sleeves that are required to be assembled together to ensure proper assembly of the joint pack. In particular, the dimension of the receptacle 604 of in FIG. 8B is configured such that only sleeve 502 (FIG. 8A) is able to be inserted therein. In addition, the shapes and dimensions of the curved protrusions 606 correspond with that of the curved notches 506 such that the protrusions 606 fittingly slide into the notches 506 when the sleeve 502 is inserted into the receptacle 604 of portion 602. Additionally, although not necessarily, the phase members 500, 600 must be oriented properly to ensure that the keyed protrusion 508 slides into the keyed slot 610. The sleeves 502, 602 thus have configurations that prevent the phase members 500, 600 from rotating about one another about axis A as well as require the phase members 500, 600 to be oriented in a predetermined direction when coupled to one another. It should be noted that the illustrated and described configurations of the sleeve and their respective interfaces in FIGS. 7 and 8A-8B are merely exemplary, it should be appreciated that the sleeves and their respective interfaces can have any type of shape, configuration and/or dimension, and are thus not limited to those shown in the Figures herein.

The joint packs 100 described above in FIGS. 2 and 3 as well as poka yoke joint pack 400 in FIG. 7 utilizes nesting of the phase members, when assembled, to decrease the overall physical dimension of the joint pack while meeting creepage and clearance limits mandated by standards (e.g. Underwriters Laboratory (UL) Standard UL 0857). As discussed, the sleeves as well as the insulating plates of each of the phase members are made of insulated material that allow only a predetermined amount electricity within a particular phase to creep or pass through-air to one or more other phases in the joint pack and vice versa. However, by decreasing the amount of physical space between adjacent phase members, an unacceptable increase or decrease in the amount of creepage or through-air clearance can occur, causing the joint pack to fail its guideline standards.

To overcome this potential problem, one or more axial sleeves of phase members in the joint pack are configured to at least partially overlap with one or more adjacent sleeves to form a nesting arrangement when the phase members are assembled. In particular, as shown in FIG. 7, each of the axial sleeves is designed to overlap vertically, whereby each sleeve has a top interface that fits within or nests with a receiving bottom interface of the sleeve directly above it. Again, the example shown in FIGS. 8A and 8B illustrates how the axial sleeves 502, 602 of adjacent phase members are designed to have male and female features that allows the axial sleeve 502 to be inserted within the receptacle 604 of axial sleeve 602. By achieving the nesting arrangement, it is possible to pass material through the energized bus while retaining clearances for purposes of clamping or close proximity design. Further, not only does nesting of phase members reduce the overall spacing of the joint pack, but it allows short circuit measures that are typically not achievable by other means.

It should be noted that although the phase members can be designed such that the axial sleeves nest with one another when the joint pack is assembled, it is not necessary that the axial sleeve exhibit poka yoke features. For instance, it is contemplated that each axial sleeve can have a similar top interface (e.g. a protrusion) and a bottom interface (e.g. receptacle) such that the axial sleeves nest within one another when the joint pack is assembled.

Assembly of the joint pack will now be discussed in terms of the poka yoke aspect illustrated and discussed in light of FIG. 7. The components of the joint pack 400 are arranged and/or stacked from the top joint pack cover 402 through the bottom joint pack cover 404: the top joint pack cover 402; the ground phase member 406; the first intermediate phase member 408; the second intermediate phase member 410; the ground phase member 412; the bottom joint pack cover 404; the bolt 114, the nut 116 and the washers 118A and 118B. In addition, it should be noted that each phase member 406, 408, 410, 412 includes one or more conductor plates which are assumed to be already be coupled to the respective phase members 406, 408, 410, 412.

During the assembly, ground phase member is 412 coupled only with the bottom joint pack cover 404 by inserting the bottom interface 428 into the receiving aperture 430. Thereafter, the bottom interface 424 of intermediate phase member 410 is coupled only with the top interface 426 of the ground phase member 412, wherein at least a portion of the bottom interface 424 is inserted into and received by the top interface 426 such that the interfaces 424 and 426 nest with one another. Following, the bottom interface 420 of intermediate phase member 408 is coupled only with the top interface 422 of the intermediate phase member 410 wherein at least a portion of the bottom interface 420 is inserted into and received by the top interface 422 such that the interfaces 420 and 422 nest with one another. The bottom interface 414 of ground phase member 406 is then coupled only with the top interface 418 of the intermediate phase member 408, wherein at least a portion of the bottom interface 414 is inserted into, and thus received by, the top interface 418 such that the interfaces 414 and 418 nest with one another. Following, the top interface 412 of ground phase member 406 is inserted into and coupled only with the receiving aperture 416 of the top joint pack cover 402. In the aspect in which the joint pack 400 includes integrated spacer standoffs, the standoffs automatically come into and remain in contact with the opposing conducting plate when two adjacent phase members are coupled to one another to space the adjacent phase members apart. Further, in an aspect, the ribs 306 and/or gaskets 138 of the top and/or bottom joint pack covers 402, 404 come into contact with the opposing conducting plate of the ground phase members when the joint pack is assembled.

Stacking the components in the preceding order automatically aligns respective central apertures along axis A, whereby the washers 118A and 118B are positioned within the joint pack covers 402, 404. A bolt 114 is then able to be slid along axis A through the common central aperture positioned approximately at a center of the joint pack 100. The bolt 114 and the nut 116 are then tightened to secure the components together, thereby defining the respective spaces of each of the pairs of opposing connector members 406, 408, 410, 412 for slidably engaging therebetween a phase-conductor of a bus assembly. Tightening the bolt 114 and the nut 116 compresses the washers 118A, 118B, which aids in distributing the compressive load of the bolt 114 and the nut 115, as well as securing or locking the nut 116 in place to prevent an accidental loosening of the nut 116 during use of the joint pack 400 in the bus assembly system 10.

It should be noted that although a particular order is discussed above with regard to the assembly of the joint pack 400 (i.e. beginning from the bottom joint pack cover upwards toward the top joint pack cover), it is contemplated that the assembly can begin at the top joint pack cover or anywhere between the top and bottom joint pack covers. For example only, it is possible that assembly begin with coupling of phase members 408 and 410, whereby the remaining components are vertically stacked to the coupled phase members 408 and 410.

While particular aspects and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the present disclosure as defined in the appended claims.

What is claimed is:

1. A joint pack comprising:
    a first phase member having a first insulator plate and a first axial sleeve coupled to the first insulator plate, wherein the first axial sleeve includes a first central aperture extending through the first axial sleeve along an axis, the first phase member including a first conductor plate disposed on a bottom surface with the first insulator plate, wherein the first conductor plate includes a first aperture extending therethrough located a predetermined distance from the first axial sleeve, the first insulator plate including a first integrated standoff spacer protruding from the bottom surface in a direction parallel to the axis through the first aperture; and
    a second phase member coupled to the first phase member, the second phase member having a second insulator plate and a second axial sleeve coupled to the second insulator plate, the second axial sleeve including a second central aperture extending therethrough along the axis, wherein the second axial sleeve is in contact with the first axial sleeve and wherein the first and second central apertures are aligned along the axis to form a phase space between the first and second phase members, the second phase member including a second conductor plate disposed on a top surface of the second insulator plate, wherein the first integrated standoff spacer is in contact with the second conductor plate.

2. The joint pack of claim 1, wherein first phase member is a grounded phase member.

3. The joint pack of claim 1, wherein first phase member is an intermediate phase member positioned adjacent to a grounded phase member.

4. The joint pack of claim 1, wherein the second conductor plate includes a second aperture extending therethrough and located a predetermined distance from the second axial sleeve, the second phase member further comprising: a second integrated standoff spacer protruding from the top surface of the second insulator plate in a direction parallel to the axis through the second aperture, wherein the second integrated standoff spacer is in contact with the first conductor plate within the phase space.

5. The joint pack of claim 1, wherein the first integrated standoff spacer is integrally molded with the first insulator plate.

6. The joint pack of claim 1, wherein the first integrated standoff spacer is laterally positioned the predetermined distance from the first axial sleeve to prevent an inserted phase conductor from being inserted beyond the first integrated standoff spacer.

7. The joint pack of claim 1, wherein the first axial sleeve includes a bottom interface and the second axial sleeve includes a top interface, wherein the top and bottom interfaces have mirrored configurations that mate with one another when the first phase member and the second phase member are coupled to one another.

8. The joint pack of claim 1, wherein at least a portion of the first phase member is not rotatable with respect to the second phase member about the axis.

9. The joint pack of claim 1, wherein the first axial sleeve has a receptacle at a bottom interface and the second axial sleeve includes a protrusion in a top interface, wherein the second axial sleeve is configured to be at least partially inserted into the receptacle of the first axial sleeve to form a nesting arrangement between the first and second phase members.

10. A joint pack comprising:
    a top joint pack cover;
    a bottom joint pack cover;
    a first phase member proximal to the top joint pack cover, the first phase member further comprises:
        a first axial sleeve oriented along an axis;
        a first insulator plate extending along a first plane substantially perpendicular to the axis, the first insulator plate having a top surface and a bottom surface;
        a first conductor plate at least partially disposed on the bottom surface of the first insulator plate and having a first aperture, the first aperture located a predetermined distance away from the first central aperture;
        a first standoff spacer integral with the first insulator plate and protruding from the bottom surface through the first aperture of the first conductor plate; and
    a second phase member proximal to the bottom joint pack cover and distal to the top joint pack cover, the second phase member coupled to the first phase member in a vertically stacked configuration, the second phase member further comprising:
        a second axial sleeve oriented along the axis;
        a second insulator plate extending along a second plane parallel to the first plane, the second insulator plate having a top surface and a bottom surface, a second conductor plate at least partially disposed on the top surface of the second insulator plate, wherein the first standoff spacer protrudes from the bottom surface of the first insulator plate and is in contact with the second conductor plate of the second phase member to maintain a phase space between the first and second phase members.

11. The joint pack of claim 10, wherein the second conductor plate further includes a second aperture located a predetermined distance away from the second axial sleeve, the second phase member including a second standoff spacer integral with the second insulator plate and protruding from the top surface of the second phase member through the second aperture to be in contact with the first conductor plate of the first phase member.

12. The joint pack of claim 10, wherein the first phase member is a ground phase member, and the second phase member is an intermediate phase member.

13. The joint pack of claim 10, wherein the top joint pack cover member includes a rib in contact with a top surface of the first phase member.

14. The joint pack of claim 10, wherein the first standoff spacer is integrally molded with the first insulator plate.

15. The joint pack of claim 10, wherein first and second axial sleeves have a poka yoke configuration and are different with respect to one another such that the first and second axial sleeves are required to be coupled together in a predetermined order and orientation to form the joint pack.

16. The joint pack of claim 10, wherein at least a portion of the first phase member is not rotatable with respect to the second phase member about the axis.

17. The joint pack of claim 10, wherein the first axial sleeve and the second axial sleeves are configured to at least partially overlap along the axis to form a nesting arrangement.

18. A method of assembling a joint bus pack, the method comprising:

selecting a first phase member that includes a first axial sleeve oriented along an axis and a first insulator plate extending along a first plane substantially perpendicular to the axis, wherein the first insulator plate has a bottom surface with a first conductor plate at least partially disposed thereon and having a first aperture wherein the first aperture is located a predetermined distance away from the first axial sleeve, the first insulator plate including an integral first standoff spacer protruding away from the bottom surface and through the first aperture of the first conductor plate;

selecting a second phase member including a second axial sleeve oriented along the axis and a second insulator plate extending along a second plane parallel to the first plane, the second insulator plate having a top surface with a second conductor plate at least partially disposed thereon; and coupling the first phase member with the second phase member such that the first axial sleeve at least partially overlaps the second axial sleeve in a nesting arrangement, wherein the first standoff spacer comes into and remains in contact with the second conductor plate to maintain a phase space between the first and second phase members.

19. The method of claim 18 further comprising:

positioning a top joint pack cover above the first phase member to couple the top joint pack cover to the first phase member such that a first rib of the top joint pack cover contacts a top surface of the first phase insulator; and positioning a bottom joint pack cover below the second phase member to couple the bottom joint pack cover to the second phase member such that a second rib of the bottom joint pack cover contacts a bottom surface of the second phase insulator.

* * * * *